United States Patent [19]

Belanger et al.

[11] Patent Number: 5,713,092
[45] Date of Patent: Feb. 3, 1998

[54] COUNTERWEIGHTED VEHICLE LAUNDRY TOP BRUSH AND POSITION CONTROL SYSTEM THEREFOR

[75] Inventors: Michael J. Belanger, Novi; Robert J. Wentworth, Farmington Hills; Barry S. Turner, Livonia, all of Mich.

[73] Assignee: Belanger, Inc., Northville, Mich.

[21] Appl. No.: 635,583

[22] Filed: Apr. 22, 1996

[51] Int. Cl.⁶ ............................................. B60S 3/06
[52] U.S. Cl. .................. 15/53.2; 15/53.3; 15/DIG. 2; 074/589; 074/590; 074/603
[58] Field of Search .................... 15/55.1–53.3, 15/97.3, DIG. 2; 74/589, 590, 603

[56] References Cited

U.S. PATENT DOCUMENTS

| | | | |
|---|---|---|---|
| 1,035,324 | 8/1912 | Dalfond | 74/589 |
| 3,292,192 | 12/1966 | Maxwell. | |
| 3,304,565 | 2/1967 | Fuhring | 15/DIG. 2 |
| 3,662,418 | 5/1972 | Kamiya. | |
| 3,758,906 | 9/1973 | Takeuchi | 15/DIG. 2 |
| 3,774,259 | 11/1973 | Genaro | 15/DIG. 2 |
| 3,823,356 | 7/1974 | Paavola et al.. | |
| 4,039,014 | 8/1977 | Sellars | 15/DIG. 2 |
| 4,495,667 | 1/1985 | Boncaglione et al.. | |
| 4,593,425 | 6/1986 | Bivens | 15/DIG. 2 |
| 4,689,749 | 8/1987 | Glogowski. | |
| 4,691,401 | 9/1987 | Machin. | |

FOREIGN PATENT DOCUMENTS 1181441  2/1970  United Kingdom ............... 15/DIG. 2

Primary Examiner—Terrence Till
Attorney, Agent, or Firm—Young & Basile, P.C.

[57] ABSTRACT

A horizontal top brush for a vehicle laundering or finishing plant wherein a brush rotated by an hydraulic motor is mounted between the free ends of pivot arms carried by spaced vertical stanchions flanking a vehicle treatment location. Counterweight arms on the left and right sides of the wash lane have an axis of rotation which is spaced from the axis of rotation of the brush pivot arms. The counterweight arms are mechanically interconnected with the brush arms by sector gears, an arrangement which permits all of the brush and counterweight arms to lie on one side of the vertical support stanchions. The brush arms are slotted to permit the counterweight arms to pass through them. Brush position relative to the vehicle is varied as a function of brush motor reaction which in turn is a function of brush contact pressure or depth. Electromagnetic sensors on a torque arm carrying the brush motor casing sense angular displacement of the torque arm relative to the brush support arm and vary brush position to maintain a desired contact pressure.

10 Claims, 4 Drawing Sheets

5,713,092

COUNTERWEIGHTED VEHICLE LAUNDRY TOP BRUSH AND POSITION CONTROL SYSTEM THEREFOR

RELATED APPLICATION

This application relates to copending patent application Ser. No. 08/635,584, POSITION CONTROL SYSTEM FOR VEHICLE LAUNDRY TOP BRUSH, filed concurrently herewith.

FIELD OF THE INVENTION

This invention lies in the field of vehicle laundering apparatus. More particularly, the invention relates to a novel space saving counterweight arrangement for a vehicle top brush characterized by separate but adjacent brush and counterweight support arms which are interconnected by gears and which have overlapping ranges of angular displacement.

BACKGROUND OF THE INVENTION

Vehicle laundering and finishing systems using rotating brushes for cleaning and/or polishing the exterior surfaces of automotive vehicles are well known and in widespread commercial use throughout the United States. A typical top brush installation includes vertical stanchions mounted on opposite sides of a vehicle treatment position, each stanchion serving as the fulcrum point for a pivot arm or beam opposite lengths of which extend away from the support stanchion in opposite directions. The brush is carried at one end of each pivot arm and a counterweight of appropriate weight is carried at the opposite end of each arm. The counterweight, fulcrum points and relative arm lengths on either side of the fulcrum points may be chosen to produce an essentially neutral pivotal structure requiring little power to move through its angular range of motion. The structure resembles a teeter-totter and is characterized by opposite pivot arm lengths which maintain a constant 180° angular relation between them.

A problem associated with an arrangement of this type arises out of the fact that space must be allocated on both sides of the vertical stanchions which support the pivot arms; i.e., the fulcrums of the arms are centered at the stanchions and the arms extend in both directions therefrom. This problem becomes particularly acute in tunnel or conveyor type vehicle laundries where longitudinal space along the conveyor is at a premium because, for example, of the desire to add accessories to the laundering function; e.g., tire scrubbers, underbody sprays, wax sprays, and blower arches for drying the vehicle. It would, accordingly, be advantageous to be able to place both the brush and the counterweight on one side of the support stanchions.

SUMMARY OF THE INVENTIONS

According to the present invention, a space saving counterweight system for a vehicle top brush, either a washing brush or a polishing brush, is provided which eliminates the teeter totter construction described above and allows both the brush and counterweight supports to be located on one side of the support structure which carries them. In general this is accomplished by providing separate, spaced apart pivot arms for the counterweight and brush support functions and interconnecting these arms with mechanical gears so that they displace angularly relative to one another.

In the preferred embodiment of the invention illustrated herein, brush support arms are mounted on vertical stanchions on opposite sides of a vehicle travel lane and a rotary laundering or polishing brush is carried between the free ends of the arms. Counterweight arms are pivotally mounted to the stanchions immediately above the brush support arms, the relative locations of the brush and counterweight arms being such as to cause the arms to diverge, converge, and actually pass one another as they progress through their range of angular motion. Mechanical gears interconnect the adjacent arms on each side of the installation such that angular displacement of one arm causes corresponding but opposite direction displacement of the adjacent arm. The brush support arms are of open, parallel beam construction such that the adjacent counterweight arm can pass through the brush arm as the two arms cross paths. Suitable shrouding is provided to protect workers in a manner hereinafter described in detail. A jackshaft is mounted between the counterweight arms so as to maintain alignment during all typical conditions of brush operation.

The inventions are described hereinafter by reference to an illustrative embodiment in the form of a double counterweighted top brush system for conveyor type vehicle laundry installations having a position control system. It will be apparent to those skilled in the vehicle laundering and finishing arts that the invention is, however, usable in both conveyor and rollover type operations.

DETAILED DESCRIPTION OF THE ILLUSTRATIVE EMBODIMENT

Counterweight System

Figure 1:
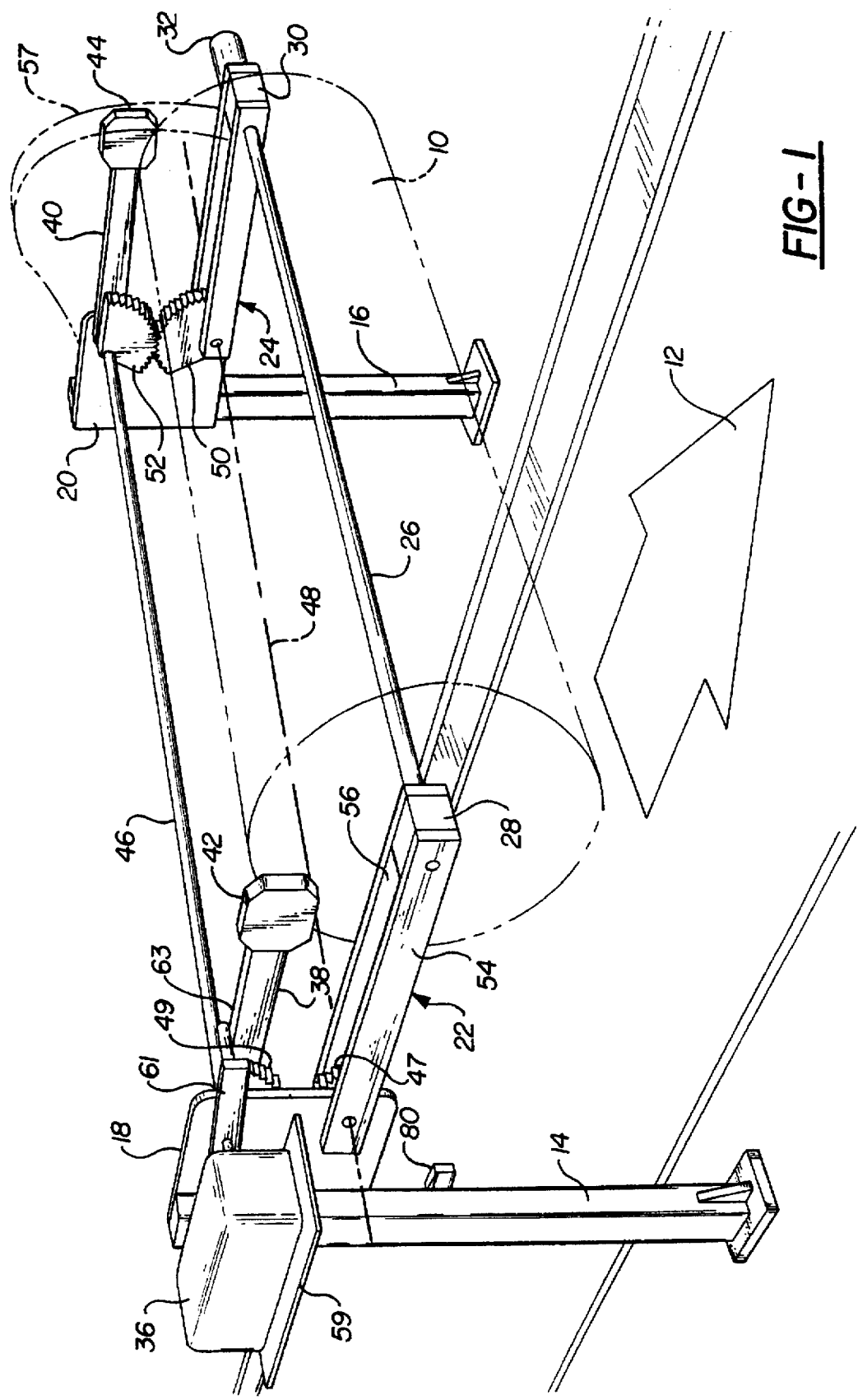
FIG. 1 is a perspective drawing of a vehicle top brush counterweighted support system constructed in accordance with the invention.
Figure 2:
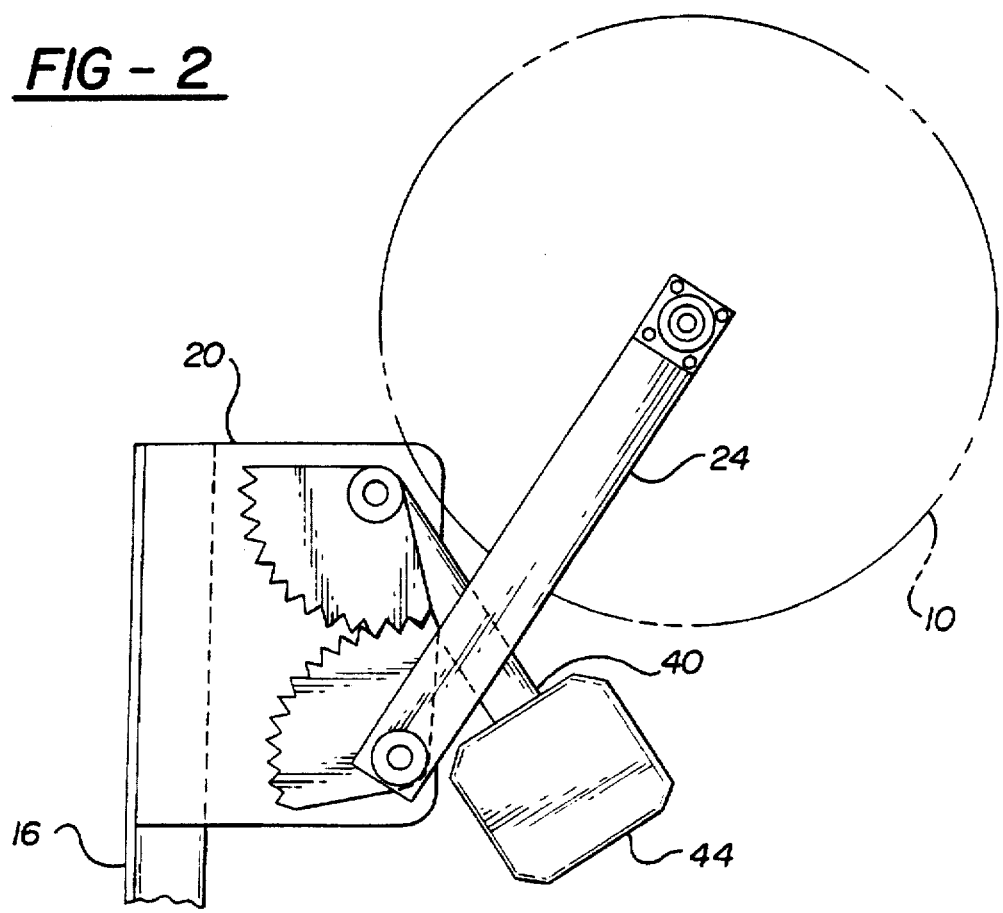
FIG. 2 is a side view of a portion of the apparatus of FIG. 1 with the counterweight and brush in a brush-raised position.
Figure 3:
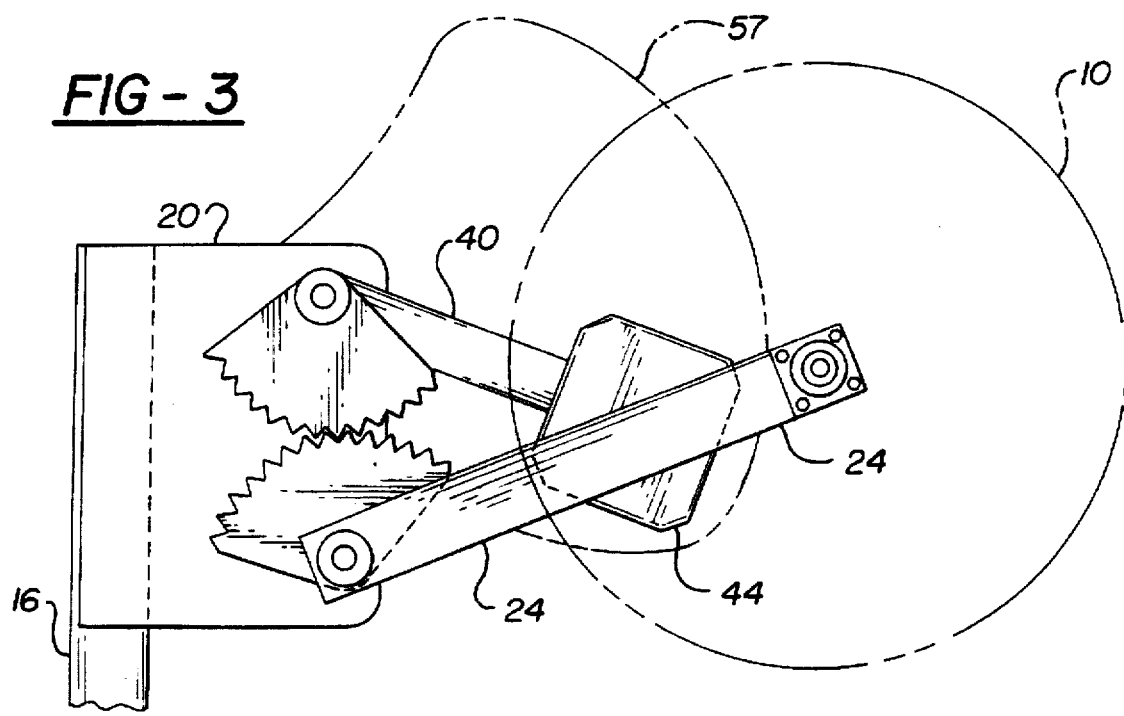
FIG. 3 shows the FIG. 2 apparatus with the brush in a partially lowered position.
Figure 4:
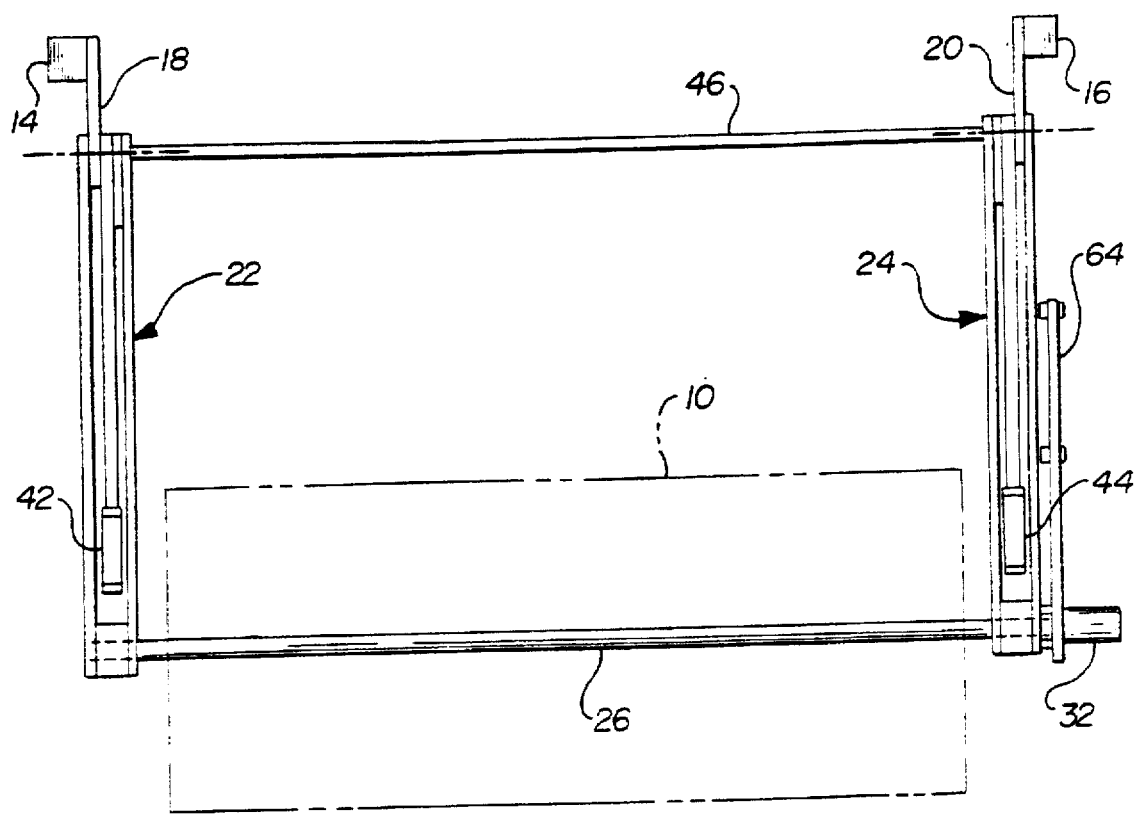
FIG. 4 is a top plan view of the apparatus of FIG. 1.

FIGS. 1–3 illustrate a compact, counterweighted support and positioning system for a top brush 10 in a conveyor type vehicle laundry having a lane 12 for travel of the vehicle through the laundry in the direction indicated by the arrow. The apparatus of FIGS. 1–3 is typically used in conjunction with other vehicle laundry system components including spray arches, side brushes, window brushes, wheel cleaners, rinse spray arches, dryer blowers, and the like.

The apparatus of FIGS. 1 through 4 comprise a pair of vertically oriented stainless steel support stanchions 14 and 16 disposed on opposite sides of the wash lane 12, the spacing between them being sufficient to permit the passage of a vehicle and provide clearance for system components. The stanchions 14 and 16 define a vehicle approach side which is to the left of the stanchions as viewed in FIG. 1 and a vehicle departure side which is to the right of the stanchions as viewed in FIG. 1. The stanchions are bolted to the floor and are of such size and strength as to be capable of bearing substantial compression and bending loads as will be apparent to those skilled in the relevant mechanical arts from the following description.

Support stanchions 14 and 16 are provided at the upper ends thereof with vertical plates 18 and 20. The planes of the plate 18 and 20 are parallel to one another and to the direction of vehicle travel. Plate 18 serves as the support for a brush support pivot arm 22 which extends outwardly in the direction of the departure side of the stanchions 14 and 16. A similar parallel brush support arm 24 is rotatably mounted on plate 20. The arms 22 and 24 are provided with suitable bearings so that they are pivotally rotatable about a common brush arm pivot axis 48 extending across the wash lane 12 at a height above lane 12 of about four feet.

Brush 10 has a center shaft 26 which is mounted in and through bearing boxes 28 and 30 at the free ends of the pivot arms 22 and 24 respectively. An hydraulic brush drive motor 32 is carried by the brush arm 24 the impeller of which is supplied with hydraulic fluid pressure by a pump (not shown) to rotate the brush 10 in the proper direction on demand. A motor 36 controls the position of the brush arms as hereinafter described in detail.

To reduce the power requirements of the motor 36 by effectively reducing brush weight, a pair of counterweight arms 38 and 40 are pivotally mounted to the plates 18 and 20 respectively for rotation in a vertical plane and about an axis defined by a jack shaft 46 which connected between the arms 38 and 40 insures synchronism of the pivotal movement of the arms. Heavy metal counterweights 42 and 44 are carried at the free ends of the arms 38 and 40, respectively. All of the arms 22, 24, 38 and 40 extend into the departure side of the stanchions 14 and 16 and the paths of travel of the arms overlap as shown in FIGS. 2 and 3. The counterweights are selected such that the brush is slightly "heavy"; i.e., the brush would, in the absence of external inputs, tend to fall slowly downward under the force of gravity.

Arms 22 and 38 are mechanically interconnected by gears 47 and 49. Arms 24 and 40 are similarly interconnected by gears 50 and 52. The gears 47, 29, 50 and 52 are sectorial in shape and have meshing peripheral teeth such that movement of arms 38 and 40 in the downward direction, for example, produces a corresponding movement of arms 22 and 24 in the upward direction. The angle between the arm set 22 and 38, for example, varies as the arms move relative to one another.

Arm 22 is constructed of spaced, parallel beams 54 and 56 which define between them a center slot through which counterweight 42 and arm 38 can pass as the brush 10 is raised from the FIG. 1 position to the FIG. 2 position. Arm 24 is of similar construction, comprising beams 60 and 62 to allow counterweight 44 to pass through its center slot. While a hollow brush arm construction is preferred, offsetting the arms slightly to permit them to pass one another without interference is essentially an equivalent approach.

Hollow plastic shrouds 57 are disposed about the counterweights and arms as shown in FIG. 3 to prevent persons from placing hands, arms or tools between the arms as they progress through their overlapping paths of travel. Although shown only on one side of the assembly; i.e., around arm 40 in FIGS. 1 and 3, it will be understood that such a shroud is placed at each side of the assembly. The shroud 57 is secured to plate 20 and lies entirely inside of the center slot of the associated brush arm.

The drive motor 36 is located on a support plate 59 which is welded or bolted to stanchion 14. The motor output shaft drives an arm 61 having a pin 63 which bears against the side of the counterweight arm 38 to drive it in the downward direction; i.e., in a direction which raises the brush. This is essentially a one-way drive and a corresponding system is more fully described in the copending application "Suspension and Control System for a Vehicle Surface Treating Implement," Ser. No. 08/508,979, filed Jul. 28, 1995.

Brush Positioning System

Figure 5:
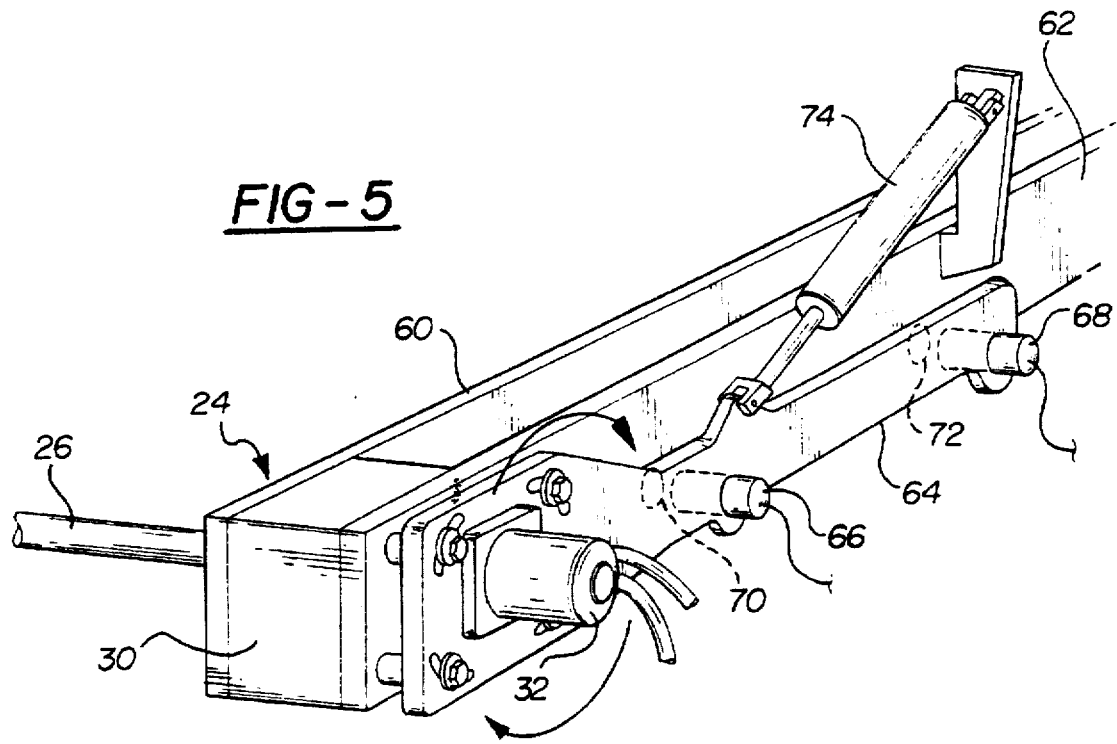
FIG. 5 is a perspective view of a detail of the position sensing apparatus.
Figure 6A:
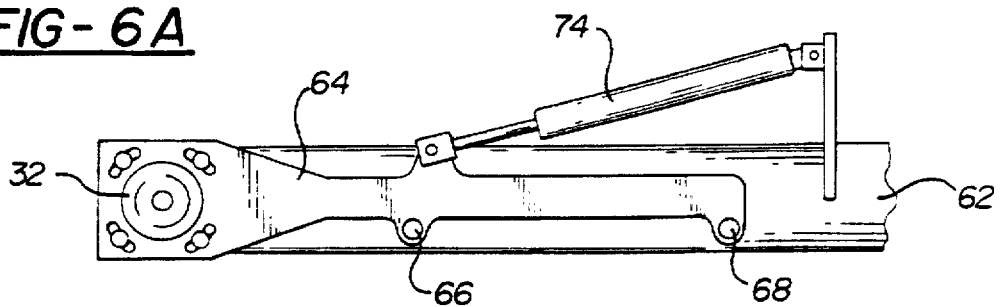
FIGS. 6A–6C are side views of the position sensing apparatus in different positions relative to the brush support arm on which it is mounted representing different levels of motor reaction torque and brush contact depth.
Figure 6B:
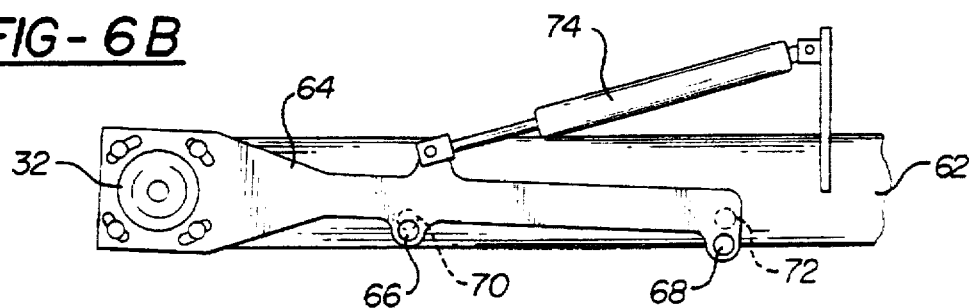
Figure 6C:
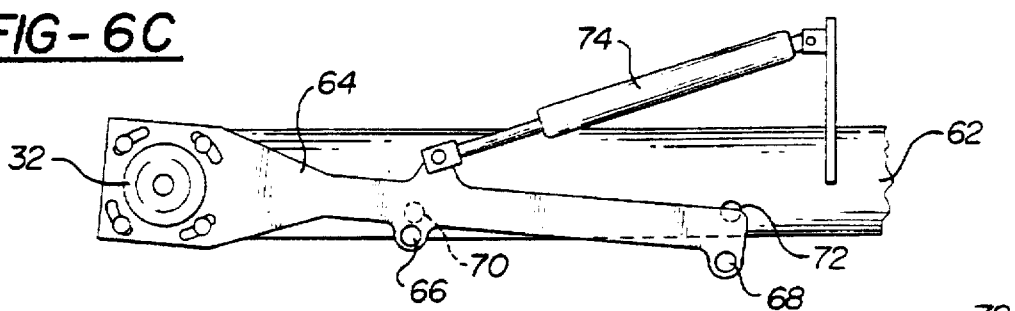
Figure 7:
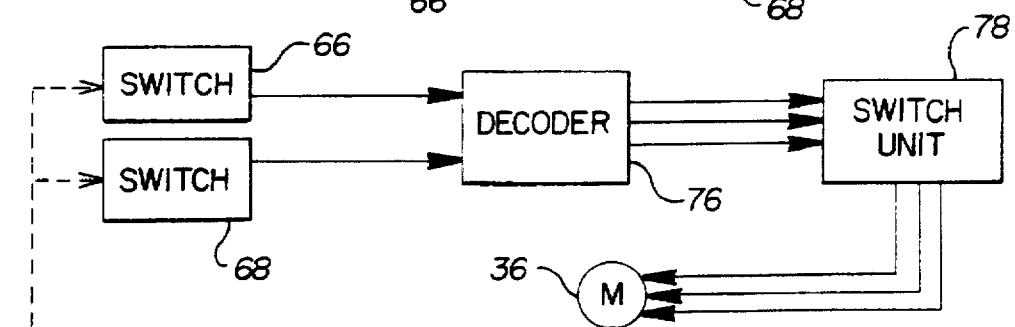
FIG. 7 is a block diagram of a position control system utilizing the signal conditions generated by the sensors in the apparatus of FIGS. 5 and 6A–6C.
Figure 7:
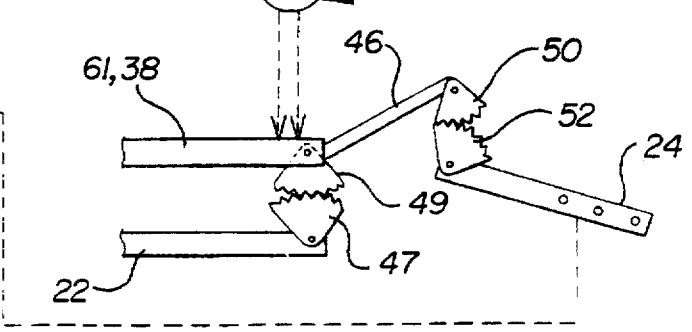

Referring now to FIGS. 5 through 7, a system for controlling the position of arms 22 and 24 as a function of the reaction torque of motor 32 will be described. As shown in FIG. 5, pivot arm 24 is formed by spaced, parallel beams 60 and 62 which straddle bearing box 30 at the free ends thereof. A "torque arm" 64 is mounted on beam 62 so that it may rotate relative to arm 24 about the axis of motor 32; i.e., about the axis of shaft 26. Motor 32 is mounted on torque arm 64 such that the motor casing and arm 64 are locked together. The impeller output shaft of the motor 32, however, is connected to motor shaft 26 either directly or via a gear box as is required for speed selection.

Because arm 64 can pivot relative to arm 24, the resistance to rotation created by friction between brush 10 and a vehicle tends to rotate arm 64 in a direction opposite brush rotation. This rotation is resisted and proportionally controlled by resilient damper 74 which functions as a spring; i.e., the greater the reaction torque, the greater the angular displacement of arm 64 relative to arm 24.

To determine the degree of relative angular displacement between the torque arm 64 and the brush pivot arm beam 62, electromagnetic proximity switches 66 and 68 are mounted on the torque arm 64 at different distances from the axis of shaft 26. The proximity switches 66 and 68 are furnished with AC line current by wiring (not shown) and work in association with ferromagnetic disks 70 and 72 which are mechanically secured such as by epoxy bonding to the surface of the beam 62 immediately under the proximity switches 66 and 68 when the torque arm 64 is aligned with the adjacent beam 62. The operation of the limit switches is such that they are in one output signal condition when the switch overlies its associated ferromagnetic disk and in an opposite signal condition when the limit switch body no longer overlies the ferromagnetic disk to a sufficient degree to establish a preset degree of electromagnetic coupling between them. The latter condition occurs as the torque arm 64 displaces away from a position of alignment with the underlying beam 62. The limit switch 68, because it lies at a greater distance from the center of shaft 26 than does the switch 66, is the first one to switch between signal conditions. By way of example, 10 degrees of rotation of arm 64 relative to arm 24 may toggle switch 68 whereas 20 degrees may be required to toggle switch 66.

The manner in which the signal conditions of the proximity switches 66 and 68 are utilized in the position control system in the apparatus of FIG. 1 is illustrated best in FIGS. 6 and 7. In FIG. 6A the torque arm 64 is in alignment with the underlying beam 62; i.e., there is no reaction torque generated by the action of the motor 32 on the brush and the reaction of the brush to the surface of the vehicle being laundered. Under this condition, the limit switch bodies 66 and 68 both lie in full registry with the associated ferromagnetic disks 70 and 72.

FIG. 6B represents an intermediate degree of reaction torque and a partial displacement of the torque arm 64 in the clockwise direction relative to the underlying brush support arm beam 62. In this condition, the limit switch 68 is displaced out of registry with the underlying ferromagnetic disk to the point that it has switched from the signal condition of FIG. 6A to the opposite signal condition. However, the limit switch 66, lying on a shorter radius from the center of rotation of motor 32 and brush shaft 26, is displaced to a lesser amount and remains in sufficient registry with the underlying ferromagnetic disc to maintain the first signal condition. The damper 74 is chosen such that the condition of FIG. 6B represents desired brush contact depth and pressure.

Looking to FIG. 6C, a high degree of reaction torque associated with great contact depth between the brush and the vehicle being laundered causes substantial clockwise displacement of the torque arm relative to the beam 62 and the condition of non-registry between both of the limit switches 68 and 66 and the underlying ferromagnetic disks 72 and 70 respectively. Accordingly, FIG. 6C represents a fully switched signal condition for both of the limit switches.

Reviewing, the conditions of the limit switches 66 and 68 in FIGS. 6A, 6B, and 6C defines a truth table which is easily implemented using a microprocessor or hardwired circuitry into a decoder for use in a controlled circuit. FIG. 6A shows both switches in the first signal condition; FIG. 6B shows one switch in each of the two signal conditions and FIG. 6C represents both switches in the opposite signal condition. If a switch having essentially aligned components is represented by a "1" and a switch having essentially non-aligned components is represented by the number "0," then the truth table is as follows:

1-1=insufficient contact pressure
1-0=desired contact pressure
0-0=high contact pressure In a control scheme, the signal condition 1-1 is set up to actuate the motor 36 so as to lower the brush 10 and increase the contact pressure with the vehicle being laundered. In the same system, the signal condition 1-0 represents satisfactory or desired contact pressure and the motor 36 is held stationary to maintain brush position. Finally, the signal condition 0-0 is set up to represent a brush reaction torque condition which actuates the motor 36 in a direction to raise the pivot arms 22 and 24 and decrease the brush contact pressure.

A control system adopting the aforementioned protocol is represented in FIG. 7. The sensors 66 and 68 produce electrical signals which are connected to a simple decoder circuit 76 which may, as mentioned above, be implemented with a microprocessor or a hard wire circuit. The decoded output, one of three signal conditions, is applied over appropriate signal lines to switch unit 78 which controls the direction of rotation of motor 36. Motor 36 drives arm 61 and counterweight arm downwardly, for example, to drive parallel arm 40 downwardly through jack shaft 46. Gears 50 and 52 raise brush pivot arm 24 to lift the brush. If the motor excitation is such as to drive motor 36 in the opposite direction, arm 61 moves away from arm 38 and allows the brush to fall. The result is a feedback type positioning system in which the signal condition 1-0 represented by the relative position of the torque arm 64 in FIG. 6B represents the desired contact pressure condition, the signal condition 1-1 represents insufficient contact pressure and the signal condition 0-0 represents too much contact pressure. The conditions of FIGS. 6A and 6C; i.e., 0-0 and 1-1 respectively, cause operation of the motor 36 in a direction which tends to reposition the brush 10 relative to the vehicle in a direction to restore the signal condition to the 1-0 state represented by FIG. 6B.

Operation

In operation, the system is placed in a home or standby condition awaiting the approach of a vehicle; the standby condition can be that represented by FIG. 1. As the vehicle approaches its presence can be detected by a wand or photoelectric device so as to start the brush motor 32 and drop the brush 10 to a position where it will engage the vehicle in the desired fashion. As the brush passes, for example, from the hood of the vehicle to the top of the vehicle, it encounters the windshield which causes an increase in contact pressure and an increase in reaction torque causing a change from the signal condition represented by FIG. 6B to the signal condition represented by FIG. 6C. The decoder 76 operates the motor 36 so as to lift the brush 10. The brush 10 is continuously varied in position to follow the contours of the vehicle so as to, for example, progress down the back light and across the rear deck of the vehicle and, where desired, down the rear vertical surface of the vehicle to the bumper level. A photoelectric device 80 is mounted on supports 14,16 to "anticipate" the rear window of the vehicle and release or drop the brush 10 early to maintain good coverage.

Although the illustrative embodiment of the inventions has been described with reference to a conveyor or tunnel type of vehicle laundry, it will be apparent to those skilled in the art that the features and advantages of the counterweighting and positioning control systems can also be used in combination with rollover or gantry type vehicle laundry systems wherein the vehicle is parked in the wash lane and the brush and support components travel on rails relative to the vehicle. Similarly, the features and advantages of the invention can be enjoyed in connection with a polishing brush as well as with wet wash laundering brushes of various types. Finally, the use of limit switches on a movable torque arm is but one way to sense motor reaction torque and use a representation of motor torque to vary brush location.

The invention claimed is:

1. A counterweighted pivotal arm mounting system for a vehicle finishing brush comprising:

support means proximate a vehicle treatment location;

a brush support arm pivotally mounted to said support means and having a first pivot axis which extends across said location;

a counterweight support arm pivotally mounted to said support means and having a second pivot axis which is parallel to and spaced from the first axis and which extends across said location, said brush support arm and said counterweight arm extending outwardly from said support means toward one side thereof; and gear means interconnecting said brush support arm and said counterweight support arm between said first and second pivot axes respectively to permit relative rotation and angular variation between said brush support arm and said counterweight support arm.

2. The system as defined in claim 1 wherein the brush support arm and the counterweight support arm define overlapping travel ranges.

3. The system as defined in claim 1 wherein the brush support arm comprises first and second spaced parallel beams defining a center slot and said counterweight arm is mounted to travel through said slot during relative angular displacement of said arms.

4. A system as defined in claim 3 further including protective means for enshrouding at least a portion of the travel ranges of at least one of said brush and counterweight arms.

5. A counterweighted pivotal arm support system for a vehicle laundry brush comprising:

first and second supports disposed adjacent and on opposite sides of a vehicle treatment location;

each of said supports carrying:

(a) a brush support arm pivotally mounted to a respective support and having a first pivot axis which extends across the location;

(b) a counterweight support arm pivotally mounted to said support and having a second pivot axis which is parallel to and spaced from the first pivot axis and which also extends across said location, said counterweight support arm and said brush support arm extending outwardly from said support on one side thereof and having overlapping ranges of angular displacement;

(c) gear means interconnecting the arms between the pivot axes; and a vehicle treatment device mounted between free ends of said brush support arms distal from said first pivot axis.

6. A system as defined in claim 5 further including a shaft extending across said vehicle treatment location and interconnecting said counterweight arms.

7. A system as defined in claim 5 wherein the brush support arms are each constructed of first and second parallel spaced apart beams defining center slots and the counterweight arms have counterweights mounted thereon, the counterweight support arms and counterweights passing between the beams of the respective brush support arms during relative angular displacement thereof.

8. The system as defined in claim 7 further including protective means enshrouding at least a portion of a path of travel described by said counterweight arms during said relative angular displacement.

9. The system as defined in claim 5 further including means for controlling the angular position of said brush support arms.

10. A counterweighted pivotal arm mounting system for a vehicle finishing brush comprising:

support means proximate a vehicle treatment location;

a brush support arm pivotally mounted to said support means, having a first pivot axis which extends across said location, and comprising first and second spaced parallel beams defining a center slot;

a counterweight support arm pivotally mounted to said support means and having a second pivot axis which is parallel to and spaced from the first axis and which extends across said location; and gear means interconnecting said brush support arm and said counterweight support arm between said first and second pivot axes respectively to permit relative rotation between said brush support arm and said counterweight support arm, said brush support arm and said counterweight support arm being disposed to travel through said center slot during said relative rotation.

\* \* \* \* \*